US009806500B2

(12) United States Patent
Sakairi et al.

(10) Patent No.: US 9,806,500 B2
(45) Date of Patent: Oct. 31, 2017

(54) TAPE MATERIAL HAVING CLAD STRUCTURE FOR MANUFACTURING IGNITION PLUG ELECTRODE

(71) Applicant: TANAKA KIKINZOKU KOGYO K.K., Chiyoda-ku, Tokyo (JP)

(72) Inventors: Koichi Sakairi, Hiratsuka (JP); Hiroshi Matsuo, Hiratsuka (JP); Kunihiro Tanaka, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 15/504,500

(22) PCT Filed: Sep. 11, 2015

(86) PCT No.: PCT/JP2015/075794
§ 371 (c)(1),
(2) Date: Feb. 16, 2017

(87) PCT Pub. No.: WO2016/043130
PCT Pub. Date: Mar. 24, 2016

(65) Prior Publication Data
US 2017/0264082 A1    Sep. 14, 2017

(30) Foreign Application Priority Data
Sep. 19, 2014    (JP) .................... 2014-191382

(51) Int. Cl.
*H01T 13/20*    (2006.01)
*H01T 21/02*    (2006.01)
(Continued)

(52) U.S. Cl.
CPC ............ *H01T 13/39* (2013.01); *B23K 11/002* (2013.01); *H01T 21/02* (2013.01)

(58) Field of Classification Search
CPC .......... H01T 13/36; H01T 13/20; H01T 21/02; H01T 13/34; H01T 13/38; H01T 13/39; F02P 13/00; F23Q 7/001
See application file for complete search history.

(56) References Cited

U.S. PATENT DOCUMENTS

2003/0038575 A1*  2/2003  Hori .................... H01T 13/39
                                                  313/141
2005/0057135 A1*  3/2005  Yoshimoto ........... H01T 13/39
                                                  313/141
(Continued)

FOREIGN PATENT DOCUMENTS

JP    4-329286 A    11/1992
JP    6-84582 A      3/1994
(Continued)

OTHER PUBLICATIONS

PCT, International Search Report for PCT/JP2015/075794, dated Dec. 1, 2015.

*Primary Examiner* — Tracie Y Green
(74) *Attorney, Agent, or Firm* — Orrick, Herrington & Sutcliffe, LLP; Joseph Calvaruso (57) ABSTRACT

The present invention relates to a tape material for manufacturing an ignition plug electrode, the tape material being a member for forming an electrode chip, in which a base metal layer and a precious metal layer are cladded, on a bonded region set on an electrode base material of an ignition plug, the member is in the form of a long tape in which the base metal layer being in contact with the bonded region is cladded with the precious metal layer being in contact with the base metal layer, the base metal layer has a width substantially equal to one of the longitudinal width, lateral width and diameter of the bonded region. According to the present invention, bonding between a precious metal chip and a substrate can be reliably maintained to prolong (Continued)

the life of an ignition plug. Accordingly, precious metals can be efficiently used to save resources.

7 Claims, 6 Drawing Sheets

(51) Int. Cl.
*H01T 13/39* (2006.01)
*B23K 11/00* (2006.01)

(56) References Cited

U.S. PATENT DOCUMENTS

2010/0164352 A1* 7/2010 Passman ................. H01T 21/02
313/141
2014/0265813 A1 9/2014 Kowalski et al.

FOREIGN PATENT DOCUMENTS

| JP | 2004-134209 A | 4/2004 |
| JP | 2008-243713 A | 10/2008 |
| WO | WO 02/065604 A1 | 8/2002 |
| WO | WO 2013/015262 A1 | 1/2013 |

* cited by examiner

ENLARGED INTERFACE

TAPE MATERIAL HAVING CLAD STRUCTURE FOR MANUFACTURING IGNITION PLUG ELECTRODE

TECHNICAL FIELD

The present invention relates to a tape material which is used as a member for forming an ignition plug electrode (center electrode or earth electrode) and which has a clad structure. Specifically, the present invention relates to a clad tape material including a precious metal layer and a base metal layer, where the base metal layer is bonded to an ignition plug, and the precious metal layer serves as an electrode surface.

BACKGROUND ART

Precious metals and alloys of the precious metals, such as Pt, Pt alloys, Ir and Ir alloys are used in ignition plug electrodes (center electrodes and earth electrodes) to be used in internal combustion engines. Hitherto, in use of these precious metal materials as electrodes, a chip-shaped precious metal material has been commonly bonded to a base material including a heat-resistant material such as a Ni alloy on the ignition plug side. As a method for bonding the precious metal chip, laser welding is known. In the laser welding, the outer peripheral surface of a part at which a precious metal chip and a base material are in contact with each other is irradiated with a laser beam to melt the irradiated part, so that the precious metal chip and the base material are bonded to each other.

Laser welding melts the outer peripheral surface of a bonded part between a precious metal chip and a base material, but a part inside the bonded surface may be unmelted. Here, a void may remain at the bonded interface, and when the temperature is elevated during use, a gas in the void is expanded, so that cracks tend to be generated, leading to separation of the precious metal chip from the base material.

In laser welding, a molten zone is generated on the outer peripheral surface of a bonded part. The molten zone is a region formed by melting/solidification of a material. The molten zone is different in composition of the material and structures from a precious metal parent material, and is fragile and poor in electrical properties. In other words, the molten zone is not a portion that is effective as a plug material. Thus, the precious metal chip is required to have an excessive length, which is not preferable from the viewpoint of a cost based on the use amount of a precious metal, or resource saving.

The present inventors recommend application of an electrode chip formed from a precious metal layer and a substrate and having a clad structure in place of a conventional metal chip including a precious metal. The electrode chip for a plug electrode is formed by bonding a thin precious metal layer to a substrate including, for example, Ni or a Ni alloy by diffusive bonding under controlled bonding conditions. The electrode chip contributes to reduction of the use amount of a precious metal because a precious metal layer and a substrate are bonded to each other with optimum bonding conditions determined beforehand, so that the thickness of the precious metal layer can be minimized while the electrode characteristics and life are secured. Further, bonding for mounting of a chip can be facilitated because a Ni alloy etc. that is identical to a base material for the plug electrode is used as the substrate.

RELATED ART DOCUMENT

Patent Documents

Patent Document 1: JP 2004-134209 A
Patent Document 2: WO 2013/015262 A1

SUMMARY OF THE INVENTION

Problems to be Solved by the Invention

Formation of a plug electrode by use of an electrode chip by the present inventors has the above-mentioned advantages, but is required to be further improved. Particularly, improvement production efficiency associated with handling characteristics of an electrode chip is pointed out. In production of a plug, an electrode chip is positioned and placed on a surface of a base material of a fixed plug body, and bonding is then performed to form an electrode part. This operation is complicated because electrode chips are handled one by one. This improvement request is also pointed out for conventional precious metal chips, but efficiency is hardly improved.

Thus, the present invention provides a member and process for efficiently forming a plug electrode having a clad structure in which a thin precious metal layer is combined with a substrate while making use of the form of the clad structure.

Means for Solving the Problems

For solving the above-mentioned problem, the present invention provides a tape material for manufacturing an ignition plug electrode, the tape material being a member for forming an electrode chip, in which a base metal layer and a precious metal layer are cladded, on a bonded region set on an electrode base material of an ignition plug, the tape material being in the form of a long tape in which the base metal layer that is in contact with the bonded region is cladded with the precious metal layer that is in contact with the base metal layer, the base metal layer having a width substantially equal to one of the longitudinal width, lateral width and diameter of the bonded region.

Figure 1:
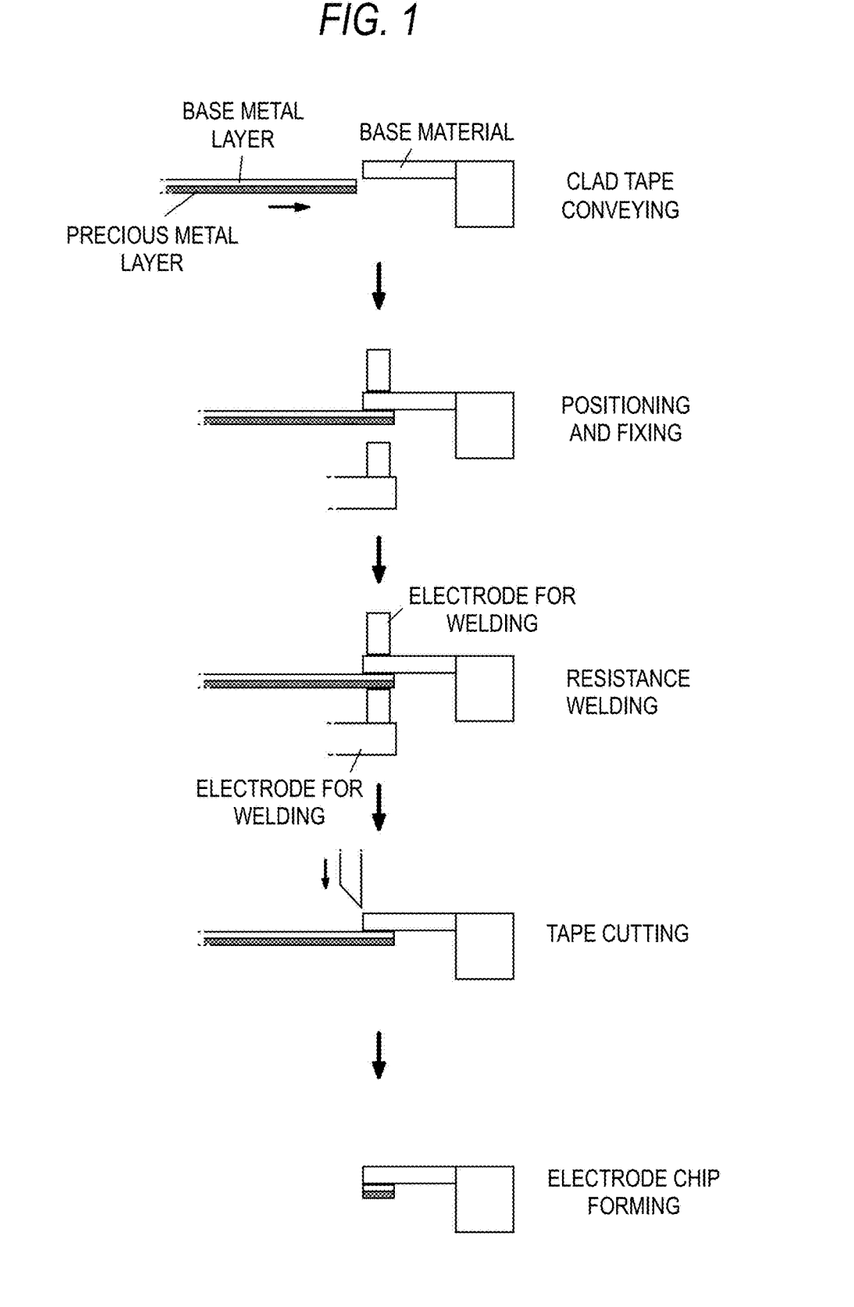
FIG. 1 is a view for explaining a process for producing an electrode chip by use of a member for producing a plug electrode according to the present invention.

In the above-mentioned conventional arts, electrode chips are individually produced, and individually bonded to a base material of a plug. On the other hand, the present invention uses a clad-shaped tape material in which chips having the same structure as that of the above-mentioned electrode chips are continuously connected. As a use form of the member including the clad tape in production of a plug electrode, a tape material is conveyed to an electrode base material of a plug, and bonded to the electrode base material by resistance welding etc., and the tape material is cut to form electrode chips (FIG. 1). The series of operations are more efficient than handling very small electrode chips one by one, and can contribute to reduction of equipment costs.

Hereinafter, the member for producing a plug electrode according to the present invention will be described. The present invention provides a tape-shaped member in which a base metal layer to be bonded to a base material of a plug electrode and a precious metal layer that is in contact with the base metal layer are cladded.

The precious metal layer includes a metal that is charged and discharged as an electrode of a plug, and the metal is preferably Pt or a Pt alloy, or Ir or an Ir alloy. Specific examples of the Pt alloy include Pt—Rh alloys, Pt—Ir alloys, Pt—Ni alloys and Pt—Cu alloys. The Pt concentration here is preferably not less than 60% by mass and not more than 97% by mass. Specific examples of the Ir alloy include Ir—Rh alloys, Ir—Fe alloys, Ir—FeNi alloys and Ir—Cr alloys. The Ir concentration of the Ir alloy is preferably not less than 50% by mass and not more than 99% by mass. Further, an alloy of Ir and Pt, i.e. an Ir—Pt alloy (having a Pt concentration of not less than 3% by mass and not more than 40% by mass) can also be applied.

The base metal layer is preferably one including Ni or a Ni alloy, or Cu or a Cu alloy. Specific examples of the Ni alloy or Cu alloy include Ni—Cr alloys, Ni—Fe—Al alloys, Ni—Fe—Co alloys, Ni—Pt alloys, Ni—Pd alloys, Ni—Ir alloys, Cu—Cr alloys, Cu—Ni alloys, Cu—W alloys, Cu—Pt alloys, Cu—Ir alloys and Cu—Pd alloys. As a typical Ni alloy, a heat-resistance Ni-based alloy such as an inconel alloy can be suitably used.

Figure 2:
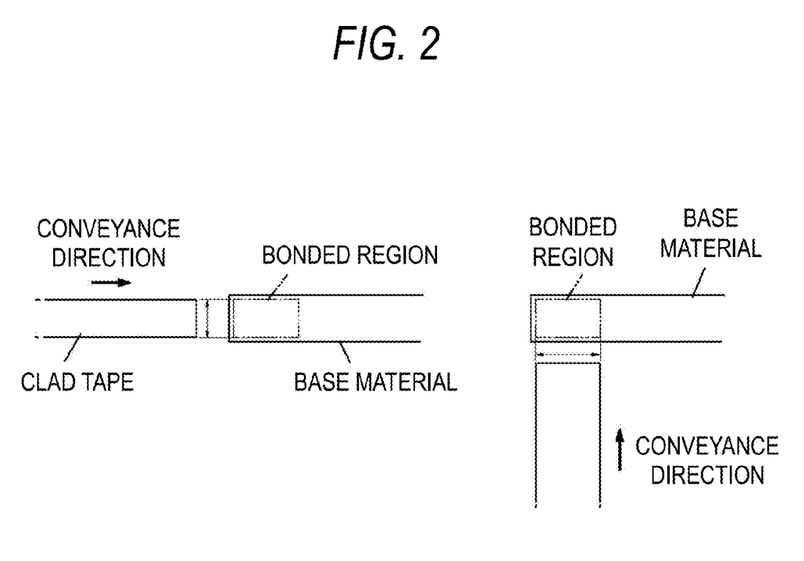
FIG. 2 is a view for explaining a relationship between the width of a clad tape according to the present invention and the width of a bonded region.

The width of the tape material may be such that the width of the base metal layer bonded to the base material of the electrode is substantially equal to that of the bonded region of the base material. Here, the bonded region is a rectangular or circular region which is defined on a surface of the base material, and defines the bottom surface of an electrode chip formed on the base material. The longitudinal width, lateral width or diameter of the bonded region is smaller in size than each of the longitudinal width and the lateral width of the base material. When the width of the base metal layer of the tape material is substantially equal to that of the bonded region, the number of cut parts after bonding can be limited to only one, so that electrode chips can be effectively formed. Whether the width of the base metal layer of the tape material is equal to the longitudinal width or the lateral width of the bonded region is determined by a conveyance direction of the tape material with respect to the base material (see FIG. 2). The width of the precious metal layer may be equal to that of the base metal layer, or may be smaller than that of the base metal layer.

The thickness of each of the precious metal layer and the base metal layer is not particularly limited. The precious metal layer is an consumable part that is subject to loads of charge and discharge, and the thickness of the precious metal layer is appropriately determined with consideration given to the electrode life and electric characteristics. On the other hand, the thickness of the base metal layer is preferably not less than 1.5 times and not more than 5 times as large as the thickness of the precious metal layer.

Figure 3:
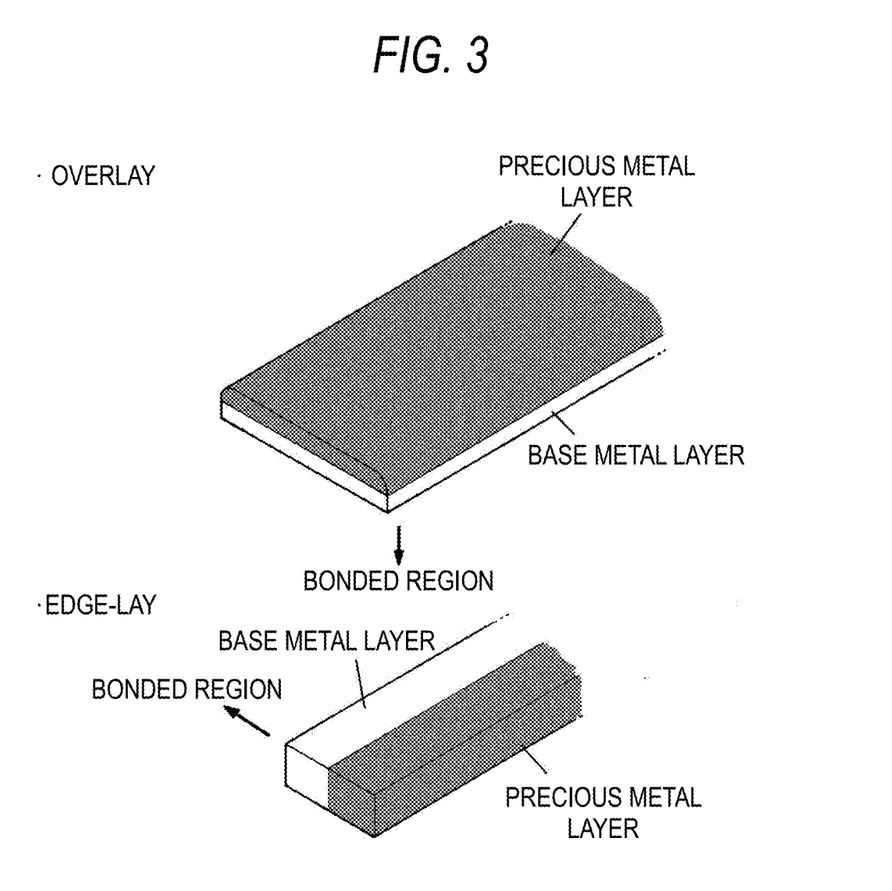
FIG. 3 is a view for explaining a lamination direction of a precious metal layer and a base metal layer in the clad tape according to the present invention.

The direction of the precious metal layer/base metal layer (lamination direction) may be a longitudinal or lateral direction. For application to a general plug electrode, a configuration (referred to as an overlay) is employed in which the precious metal layer and the base metal layer are laminated vertically (in a perpendicular direction). In recent years, however, a plug with an earth electrode having a shape in which the precious metal part is protruded has been also developed, and for this application, a configuration (referred to as an edge-lay) may be employed in which the base metal layer and the precious metal layer are laminated laterally (in a horizontal direction) (FIG. 3).

In the tape material having a clad structure according to the present invention, an intermediate layer may be formed between the precious metal layer and the base metal layer. The intermediate layer includes an alloy of Ni and a precious metal or an alloy of Cu and a precious metal. The intermediate layer is a diffusion layer formed through a heat history in bonding of the precious metal layer and the base metal layer in the process for producing the tape material. The intermediate layer is an alloy metal layer having a gradient composition (precious metal concentration). Existence of the intermediate layer improves the bonding strength between the precious metal layer and the base metal layer. The thickness of the diffusion layer is preferably not less than 5 μm and not more than 150 μm.

As a use form of the tape-shaped member according to the present invention in a plug electrode, a tape material is supplied and bonded to an electrode base material of a plug, and cut to form an electrode chip on the electrode base material. Here, bonding of the tape material to the electrode base material is preferably performed by resistance welding. Resistance welding allows an efficient bonding of the tape material to a very small region in a short time, and is suitable for formation of a plug electrode.

Figure 4:
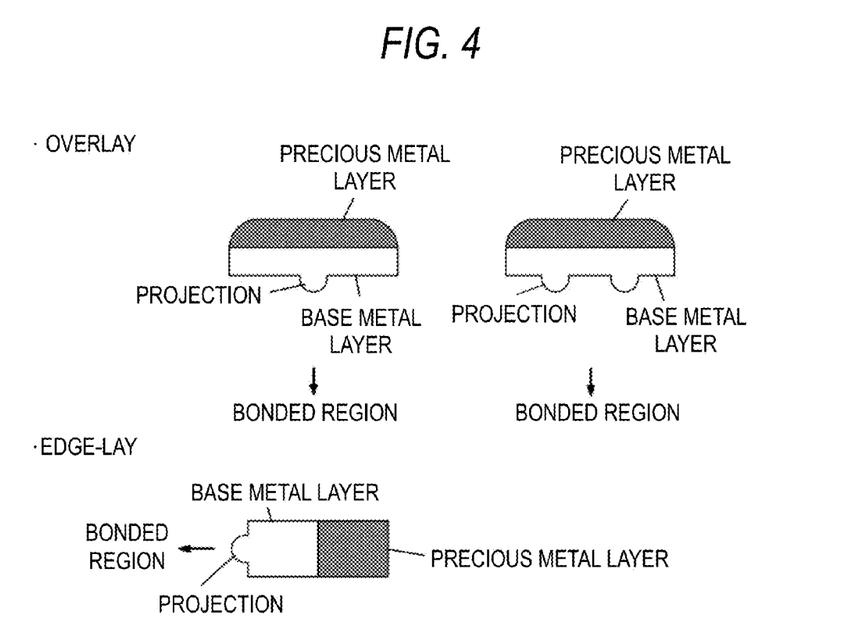
FIG. 4 is a view for explaining formation of projection(s) as a preferred configuration for the clad tape according to the present invention.

Here, in view of quality of the bonded part and improvement of bonding operation in resistance welding, it is preferable in the present invention to form at least one protrusion (projection) on a surface of the base metal layer on the bonded region side in the cross-section shape. By forming the projection(s), resistance heat generation can be concentrated to perform efficient welding in resistance welding. As illustrated in FIG. 4, one projection, or a plurality of projections may be formed. Since the member according to the present invention is a tape-shaped member, the actual shape of the formed projection is in the form of a line.

Production of the tape material for a plug electrode according to the present invention is essentially based on a process for producing a tape material having a usual clad structure. Specifically, a tape material for each of a precious metal layer and a base metal layer is processed, and both the tape materials are laid on each other, and rolled to produce a tape material having a clad structure. When a projection is formed on a surface of the base metal layer on the bonded region side, processing into a tape material and formation of the projection can be performed at the same time by using a roll with an appropriate pattern in production of a tape material for the base metal layer.

Preferably, a heat treatment is performed after the tape material for the precious metal layer and the tape material for the base metal layer are cladded. The heat treatment is performed for the purpose of improving the bonding strength by forming an intermediate layer (diffusion layer) at the interface between the precious metal layer and the base metal layer. Preferably, the heat treatment is performed by heating at a temperature of not lower than 800° C. and not higher than 1200° C. in a non-oxidizing atmosphere (vacuum atmosphere, inert gas atmosphere or the like).

By plating the bonded surface of the base metal layer with Ni or Cu in cladding of the tape material for the precious metal layer and the tape material for the base metal layer, the bonding strength between the precious metal layer and the base metal layer can be further improved. Particularly, the plating is useful when a Ni alloy such as inconel, or a Cu alloy is used in the base metal layer. The thickness of the Ni plating or Cu plating is preferably not less than 0.5 μm and not more than 20 μm.

The above-described tape material for a plug electrode according to the present invention is suitable for production of ignition plug electrode chips. The electrode chip is formed by cutting the tape material according to the present invention to an arbitrary length. An ignition plug including the electrode chip on a base material is excellent in production efficiency.

The specific process of a method or producing an electrode chip and an ignition plug includes the step of supplying a tape material according to the present invention to an electrode base material of an ignition plug, positioning the tape material, then bonding a base metal layer of the tape material to the electrode base material by resistance welding etc., and then cutting the tape material. The tape material is bonded in the form of electrode chips. After the bonding, molding processing may be performed by use of a mold.

Advantageous Effects of the Invention

As described above, electrode chips each including a precious metal layer and a base metal layer have been individually separated and isolated heretofore, and the present invention provides a member including these electrode chips in the form of a tape. According to the present invention, electrode chips can be efficiently produced by using a member having improved handling characteristics.

DESCRIPTION OF EMBODIMENTS

Hereinafter, an embodiment of the present invention will be described with reference to the drawings. In this embodiment, a tape material was produced in which a precious metal layer including a Pt alloy and a base metal layer including a Ni alloy were cladded.

A wire formed of a Pt alloy (Pt-20 wt % Ir) (line diameter: 1.0 mm, total length: 100 mm), and a wire formed of a Ni alloy (inconel 600) (line diameter: 1.0 mm, a total length: 100 mm) were provided, and were each drawing-processed to a diameter of 0.86 mm. The processed Pt alloy wire and Ni alloy wire were each rolling-processed into a 0.2 mm-thick tape material. In processing of the Ni alloy wire into the tape, a projection was formed by use of a roll with a groove on one surface side.

Next, the bonded surface of the Ni alloy was plated with Ni in a thickness of 1 μm. Thereafter, the Pt alloy tape and the Ni alloy tape were cladded by a roll. After the cladding, further the tape material was fed into a nitrogen furnace, and heat-treated at 1000° C. for 1 hour. Thereafter, finishing molding processing was performed to produce a tape material of clad structure having a trapezoidal cross-section.

Figure 5:
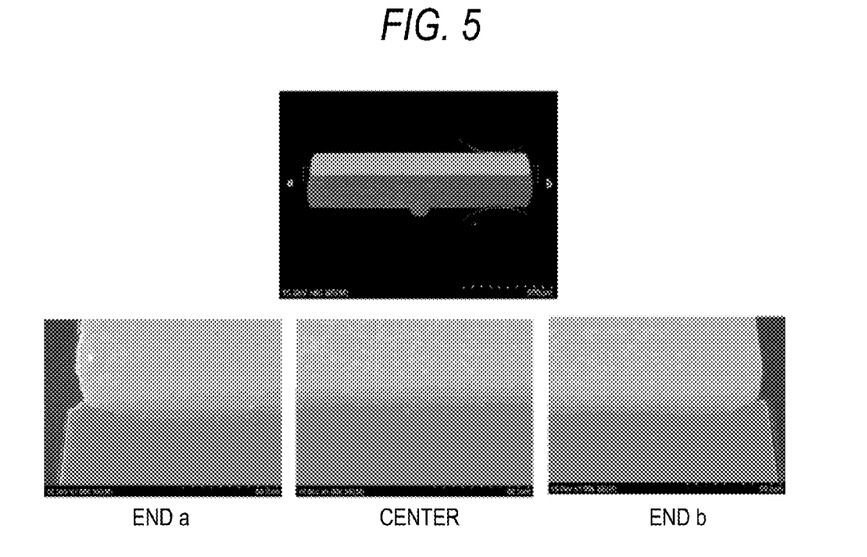
FIG. 5 is a photograph showing cross-section structures of a tape material produced in an embodiment.
Figure 6:
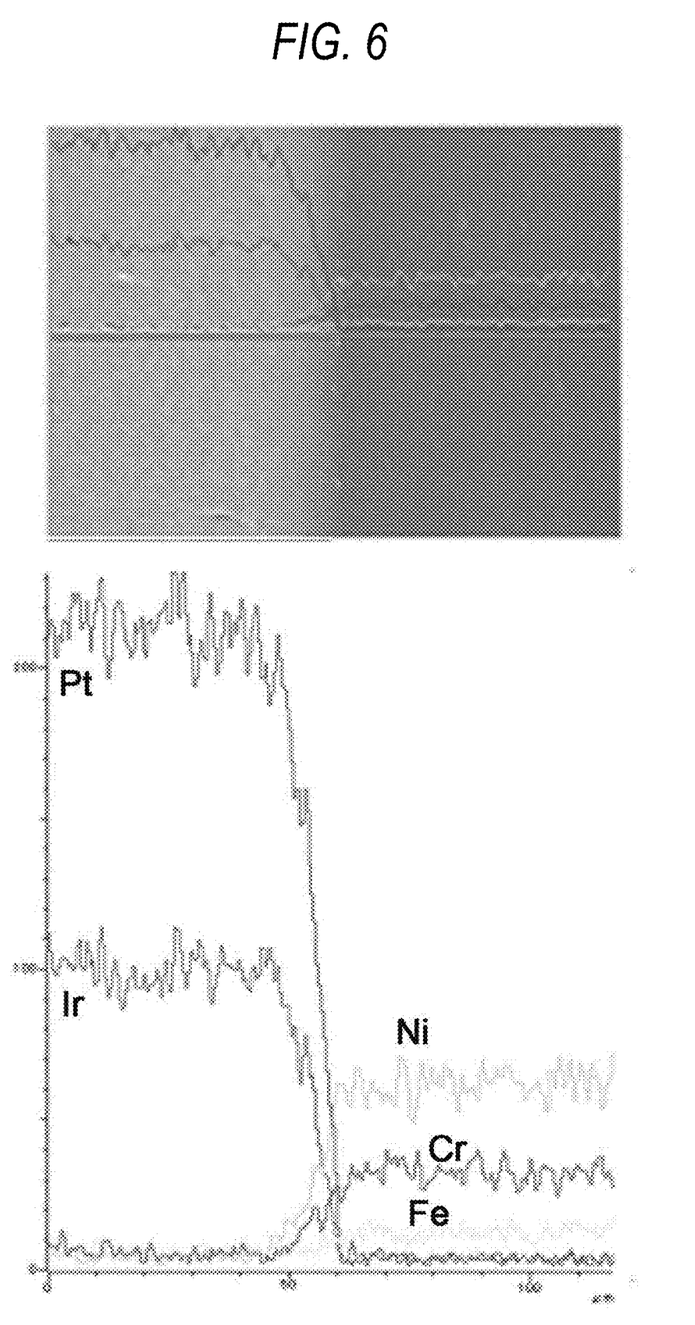
FIG. 6 is a photograph showing the results of EPMA analysis for a bonded interface in the tape material produced in the embodiment.

The cross-section was observed for the produced tape material. FIG. 5, which is a photograph showing cross-section structures, shows that a favorable bonded part free from delamination and abnormal deformation at the interface between the precious metal layer and the base metal layer is obtained. The element distribution was analyzed by EPMA for the bonded interface, results as shown in FIG. 6 were obtained. It is apparent that at the bonded interface between the precious metal layer and the base metal layer, a diffusion layer including a precious metal (Pt, Ir) and components of a Ni alloy (Ni, Cr and Fe) exists as an intermediate layer. The diffusion layer had a thickness of about 20 μm.

Next, the bonding strength under a heat cycle load was evaluated for the produced clad tape. In the heat cycle test, a sample obtained by cutting the tape material was put in an electric furnace, a cycle of operation including holding the sample at a heating temperature of 900° C. for 360 seconds and at a cooling temperature of 70° C. for 360 seconds was carried out 200 times, the sample was then taken out from the furnace, and its external appearance and bonded interface were observed.

Figure 7:
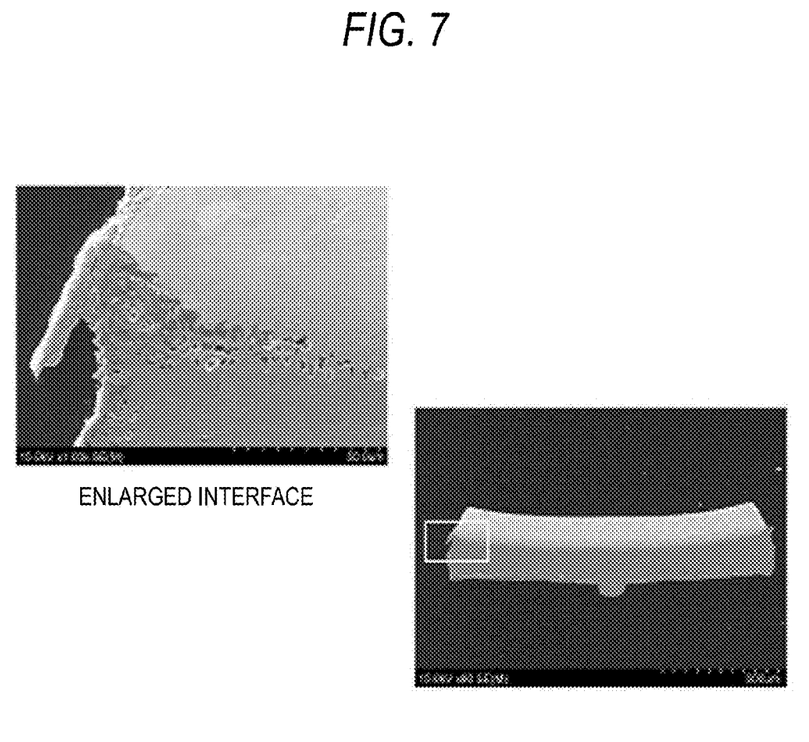
FIG. 7 is a photograph showing a cross-section state after a heat cycle test for the tape material produced in the embodiment.

Results of the heat cycle test are shown in FIG. 7. The tape material was oxidized at or near the end of the bonded interface as a result of receiving the heat cycle, but was not delaminated at the interface, and maintained a favorable state. When used with a plug electrode, the tape material may be in a favorable state with a reduced possibility of falling-off of the precious metal part.

INDUSTRIAL APPLICABILITY

According to the present invention, bonding between a precious metal chip and a substrate can be reliably maintained to prolong the life of an ignition plug, and therefore precious metals can be efficiently used to save resources.

The invention claimed is:

1. A tape material for manufacturing an ignition plug electrode, the tape material being used for forming electrode chips, in which a base metal layer and a precious metal layer are cladded, on a bonded region set on an electrode base material of an ignition plug, the electrode chips being continuously connected, wherein the tape material being in the form of a long tape in which the base metal layer that is in contact with the bonded region is cladded with the precious metal layer that is in contact with the base metal layer, the base metal layer of the tape material has a width substantially equal to one of the longitudinal width, lateral width and diameter of the bonded region, and at least one projection is formed on a surface of the base metal layer on the bonded region side in the cross-section shape of the tape material, the projection being in the form of a line.

2. The tape material for manufacturing an ignition plug electrode according to claim 1, wherein the base metal layer comprises Ni or a Ni alloy, or Cu or a Cu alloy.

3. The tape material for manufacturing an ignition plug electrode according to claim 1, wherein the precious metal layer comprises Pt or a Pt alloy, or Ir or an Ir alloy.

4. A method for manufacturing an ignition plug, comprising the step of bonding an electrode chip onto an electrode base material of an ignition plug by use of the tape material for producing an ignition plug defined in claim 1, the method comprising the step of supplying the tape material to the electrode base material of the ignition plug, positioning the tape material, bonding a base metal layer of the tape material to the electrode base material by resistance welding, and then cutting the tape material.

5. The tape material for manufacturing an ignition plug electrode according to claim 1, wherein the precious metal layer comprises Pt or a Pt alloy, or Ir or an Ir alloy.

6. A method for manufacturing an ignition plug, comprising the step of bonding an electrode chip onto an electrode base material of an ignition plug by use of the tape material for producing an ignition plug defined in claim 1, the method comprising the step of supplying the tape material to the electrode base material of the ignition plug, positioning the tape material, bonding a base metal layer of the tape material to the electrode base material by resistance welding, and then cutting the tape material.

7. A method for manufacturing an ignition plug, comprising the step of bonding an electrode chip onto an electrode base material of an ignition plug by use of the tape material for producing an ignition plug defined in claim 2, the method comprising the step of supplying the tape material to the electrode base material of the ignition plug, positioning the tape material, bonding a base metal layer of the tape material to the electrode base material by resistance welding, and then cutting the tape material.

\* \* \* \* \*